United States Patent

Mekota, Jr. et al.

[15] 3,657,705

[45] Apr. 18, 1972

[54] INSTRUCTION TRANSLATION CONTROL WITH EXTENDED ADDRESS PREFIX DECODING

[72] Inventors: John E. Mekota, Jr., Belmont; David M. Hudson, Holliston; Thomas G. Rankin, Harvard; Jean E. Champagne, Wellesley, all of Mass.

[73] Assignee: Honeywell Inc., Minneapolis, Minn.

[22] Filed: Nov. 12, 1969

[21] Appl. No.: 875,902

[52] U.S. Cl. .......... 340/172.5, 444/1
[51] Int. Cl. .......... G06f 9/18
[58] Field of Search .......... 340/172.5

[56] References Cited

UNITED STATES PATENTS

| | | | |
|---|---|---|---|
| 3,340,513 | 9/1967 | Kinzie et al. | 340/172.5 |
| 3,345,619 | 10/1967 | Anderson et al. | 340/172.5 |
| 3,351,909 | 11/1967 | Hummel | 340/172.5 |
| 3,365,703 | 1/1968 | Ulrich | 340/172.5 |
| 3,380,025 | 4/1968 | Ragland | 340/172.5 |
| 3,400,380 | 9/1968 | Packard et al. | 340/172.5 |

*Primary Examiner*—Paul J. Henon
*Assistant Examiner*—Harvey E. Springborn
*Attorney*—Fred Jacob and Ronald T. Reiling

[57] ABSTRACT

A special purpose prefix is defined which replaces the normal op-code field of an instruction, having the effect of translating that instruction from a normal instruction into an instruction with various formate extensions in addresses, indices and/or augments. The normal instruction addressing of the system has six basic formats which include: bank and subaddress coding; subaddress and index; indirect indexing; direct control addressing; indexed control addressing; indirect, indexed control addressing, and "inactive" addressing. All of the normal instructions may be extended with a special-purpose prefix.

9 Claims, 19 Drawing Figures

Patented April 18, 1972 3,657,705

11 Sheets-Sheet 1

Figures 1A, 1B, 1C:
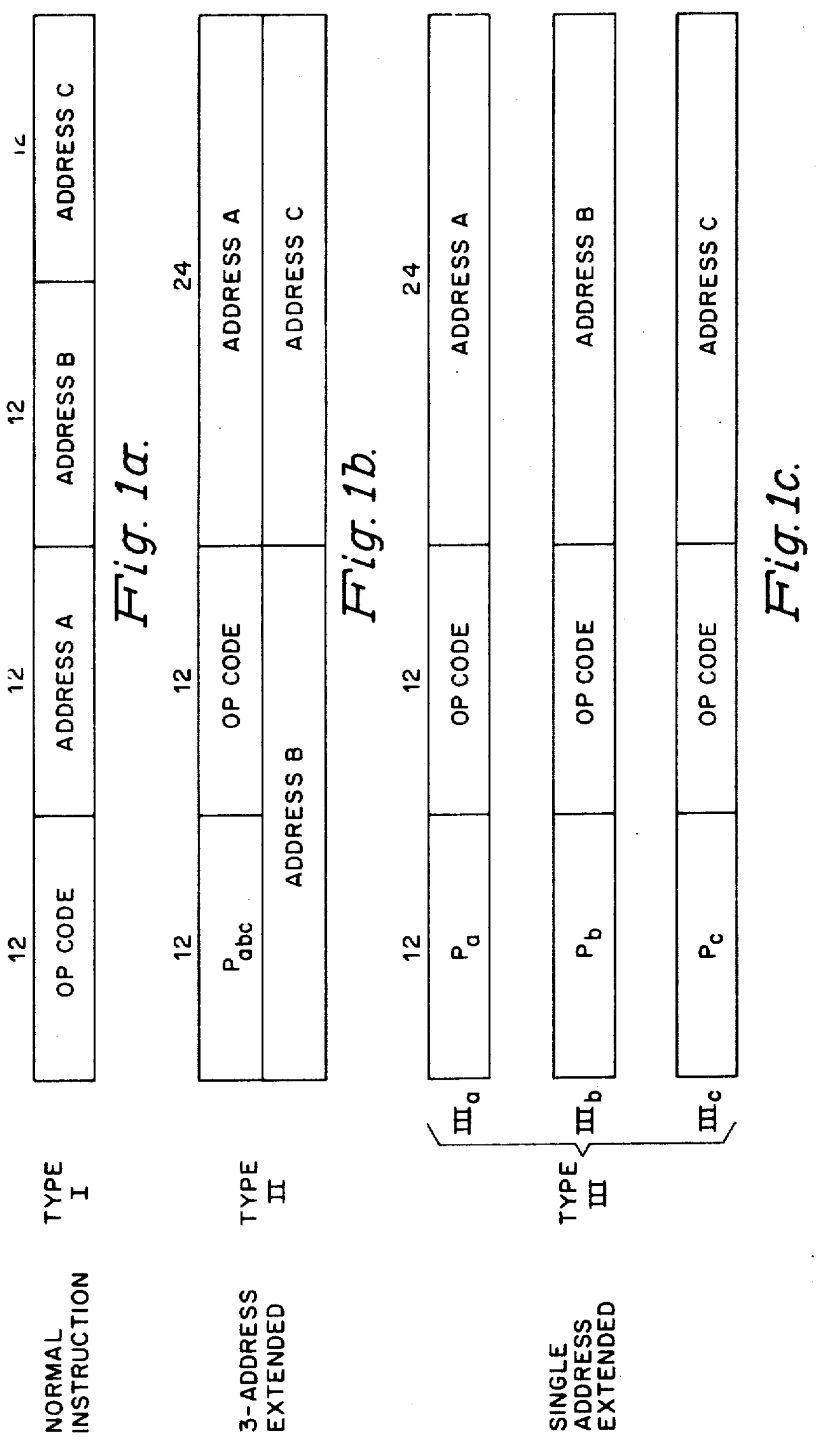

INVENTORS
JOHN E. MEKOTA Jr.
DAVID M. HUDSON
THOMAS G. RANKIN
JEAN E. CHAMPAGNE

BY Lester S. Hecht
ATTORNEY

INVENTORS
JOHN E. MEKOTA Jr.
DAVID M. HUDSON
THOMAS G. RANKIN
JEAN E. CHAMPAGNE

BY Lester S. Hecht

ATTORNEY

INVENTORS
JOHN E. MEKOTA Jr.
DAVID M. HUDSON
THOMAS G. RANKIN
JEAN E. CHAMPAGNE

BY Lester S. Hecht

ATTORNEY $I_{100}$

INVENTORS
JOHN E. MEKOTA Jr.
DAVID M. HUDSON
THOMAS G. RANKIN
JEAN E. CHAMPAGNE

BY

Lester S. Hecht

ATTORNEY

INVENTORS
JOHN E. MEKOTA Jr.
DAVID M. HUDSON
THOMAS G. RANKIN
JEAN E. CHAMPAGNE
BY
Lester S. Hecht
ATTORNEY Patented April 18, 1972 3,657,705

11 Sheets-Sheet 6

INVENTORS
JOHN E. MEKOTA Jr.
DAVID M. HUDSON
THOMAS G. RANKIN
JEAN E. CHAMPAGNE

BY [signature]

ATTORNEY

Patented April 18, 1972 3,657,705

11 Sheets-Sheet 7

INVENTORS
JOHN E. MEKOTA Jr.
DAVID M. HUDSON
THOMAS G. RANKIN
JEAN E. CHAMPAGNE

BY [signature]

ATTORNEY

INVENTORS
JOHN E. MEKOTA Jr.
DAVID M. HUDSON
THOMAS G. RANKIN
JEAN E. CHAMPAGNE

BY

ATTORNEY

INVENTORS
JOHN E. MEKOTA Jr.
DAVID M. HUDSON
THOMAS G. RANKIN
JEAN E. CHAMPAGNE

BY

ATTORNEY

Patented April 18, 1972 3,657,705

11 Sheets-Sheet 10

INVENTORS
JOHN E. MEKOTA Jr.
DAVID M. HUDSON
THOMAS G. RANKIN
JEAN E. CHAMPAGNE

BY [signature]

ATTORNEY

| | $M_1$ | $M_2$ | $M_3$ | |
|---|---|---|---|---|
| I | 0 | 0 | X | NORMAL DIRECT MAIN MEMORY ADDRESSING |
| | 0 | 1 | X | NORMAL INDEXED MAIN MEMORY ADDRESSING |
| | 1 | 0 | 0 | NORMAL DIRECT CONTROL MEMORY ADDRESSING |
| | 1 | 0 | 1 | NORMAL INDIRECT MAIN MEMORY ADDRESSING |
| | 1 | 1 | 0 | NORMAL INDEXED CONTROL MEMORY ADDRESSING |
| | 1 | 1 | 1 | NORMAL INDEXED INDIRECT MAIN MEMORY ADDRESSING |
| | 0 | 0 | X | EXTENDED DIRECT MAIN MEMORY ADDRESSING |
| II | 0 | 1 | X | EXTENDED INDEXED MAIN MEMORY ADDRESSING |
| IIIa | 1 | 0 | 0 | EXTENDED DIRECT CONTROL MEMORY ADDRESSING |
| IIIb | 1 | 0 | 1 | EXTENDED INDIRECT MAIN MEMORY ADDRESSING |
| IIIc | 1 | 1 | 0 | EXTENDED INDEXED CONTROL MEMORY ADDRESSING |
| | 1 | 1 | 1 | EXTENDED INDEXED INDIRECT MAIN MEMORY ADDRESSING |

Fig. 4b.

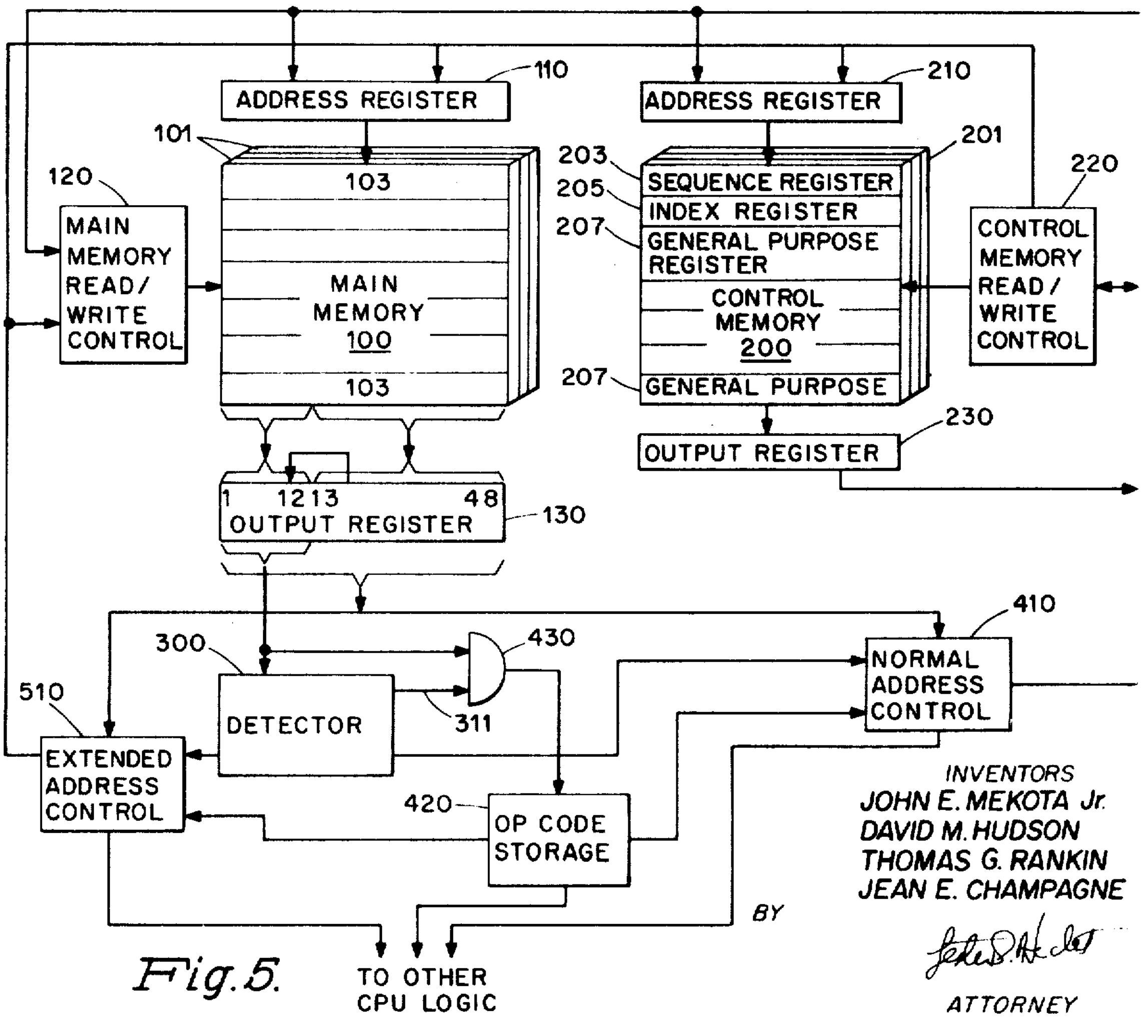

Fig. 5.

INVENTORS
JOHN E. MEKOTA Jr.
DAVID M. HUDSON
THOMAS G. RANKIN
JEAN E. CHAMPAGNE
BY
ATTORNEY

INSTRUCTION TRANSLATION CONTROL WITH EXTENDED ADDRESS PREFIX DECODING

BACKGROUND OF THE INVENTION

This invention relates to instruction translation and, more particularly, to the use of a special-purpose prefix which may appear in the normal operations code (op-code) field for the purpose of translating the instruction associated therewith to one of an extended set.

Although there does not appear to be any basic agreement as to which approach is preferable, the prior art teaches two distinct types of main memory addressing. In early machines a completely self-contained address was used which could directly and independently address any part of the main memory. Experience in program coding, assembly, loading, and relocation soon made it apparent that other, non-self-contained forms of addressing were advisable such as: relative; indirect; and indexed.

Proponents of the relative addressing techniques point to reduction in the size of an instruction address field as a major advantage of such techniques. The full address is obtained, in a typical utilization of the relative address, by combining the "subaddress" or "displacement" with a "base" or "bank" code to form the full memory address. Another advantage, besides reduction in the amount of coding, is inherent in relative addressing. A user's program may be "relocated" simply by changing the "base" or "bank." A change in "base" is the essence of relative address coding; thus, the obvious advantage in systems where several user programs must share a common memory and most often be relocated within the memory.

In many cases, however, completely self-contained addressing is advantageous. This is especially true in most supervisory or monitor programs where many absolute memory references must be made. When a relative address system is used in a situation where frequent interrupts occur, a considerable amount of time and software is required to keep record of the "base" or "bank" codes between interrupts and returns. This problem does not occur in a self-contained addressing system where all information necessary to perform an operation is contained within the instruction, obviating reference to storage for further information to carry out the instruction.

In one typical instruction format each type of instruction has a fixed length which is a multiple of, or a fraction of, a memory word. Thus, if a prefix such as is contemplated by the present invention is to be introduced into the basic format, it should be defined so as to best merge with the existing instruction format.

SUMMARY OF INVENTION

Accordingly, it is a basic object of the present invention to provide a system which contains both relative and self-contained addressing capability.

Another advantage of the full, or completely self-contained address, is that the processing time to read from memory is reduced. No special functions must be performed, as in the case of base addition, index addition or subtraction, bank appending, or the other special features related to combine a subaddress with something else to complete the address.

Accordingly, it is another object of the invention to provide a prefix coding technique which permits combining all types of addressing both partial or subaddress, and full addresses in the same basic instruction format.

It is a more specific object of the present invention to provide a prefix having the same length as a standard op-code of a given system such as is shown, for example, in FIG. 1 but which can be distinguished from any of the standard op-codes of that system by its form.

Thus, although the invention may be practiced by using a certain bit in an op-code field as a "prefix" bit, this creates an incompatible length situation in a standard word memory, and further, it reduces the number of op-codes for other purposes to one half.

In addition to the advantages of using a prefix or instruction-modifier of the same length as an op-code, the technique is also advantageous because it permits the use of previously established instructions without modification along with the new "extended" format instructions which are made possible according to the present invention.

In a system of the type illustrated specifically herein, standard or normal instructions, as later defined, may specify either main memory or control memory addresses in any of six different forms, and a new set of extended-interpretation instructions may be effectively added without any modification in the basic set. The entire set of previous op-codes will apply without modification as to execution, only the utilization of various addresses, increments, augments, or the like being effected.

Accordingly, another object of the invention is to provide a technique whereby extended-interpretation instructions may be added to a system without modifying the existing instructions.

DISCLOSURE OF EMBODIMENTS

The above and other objects of the invention are achieved in several illustrative embodiments described hereinafter. The novel features which are believed to be characteristic of the invention, both as to its organization and method of operation, together with further objects and advantages thereof will be better understood from the following description considered in connection with the accompanying drawings. It is to be expressly understood, however, that the drawings are for the purpose of illustration and description only and are not intended as a definition of the limits of the invention.

Figure 1E:
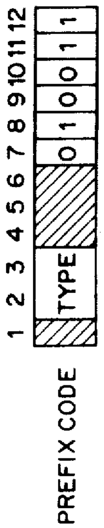
Figure 1D:
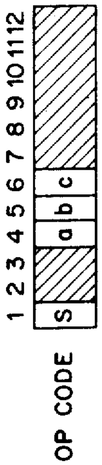
Figures 2A, 2E:
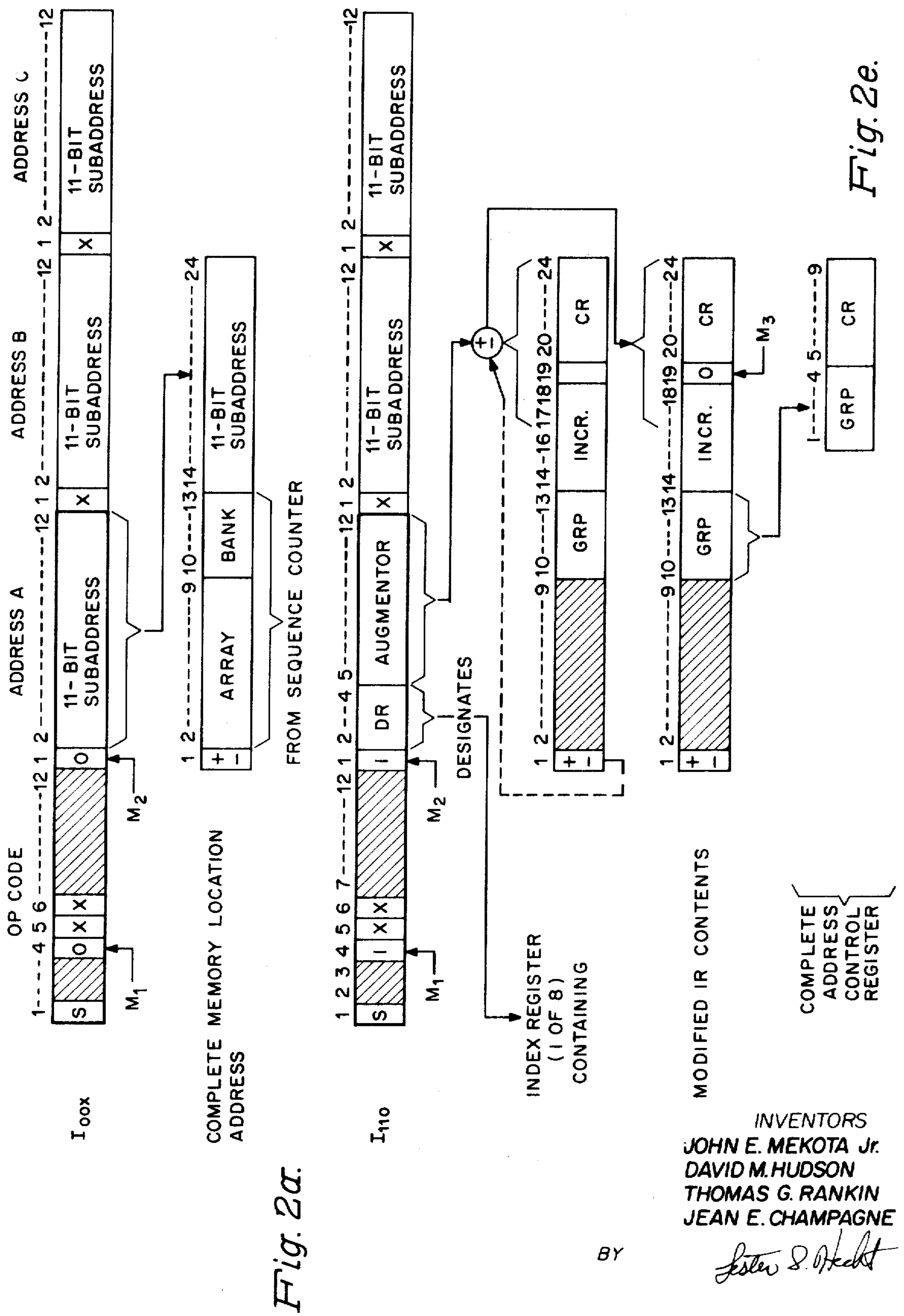
Figure 2B:
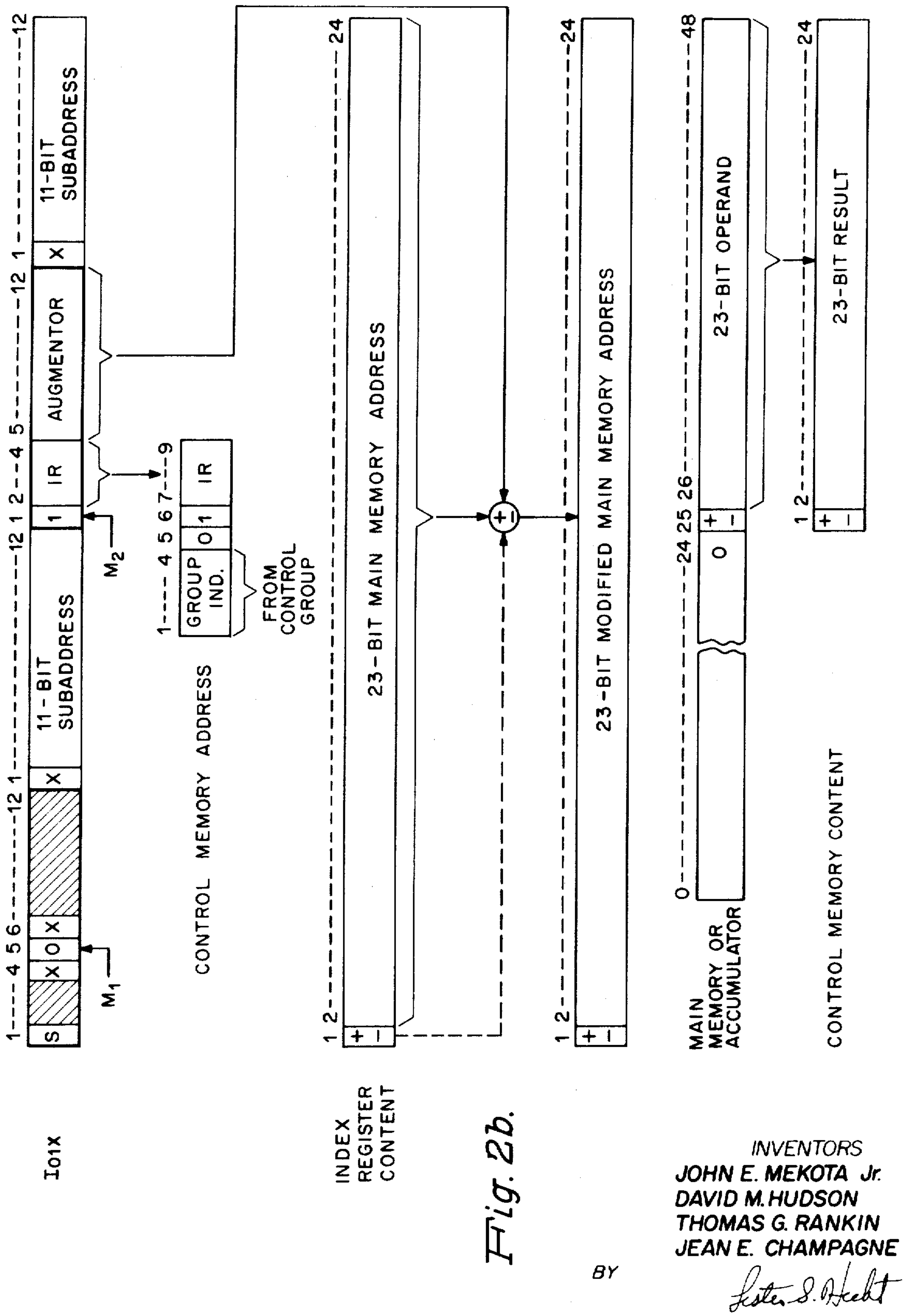
Figure 2C:
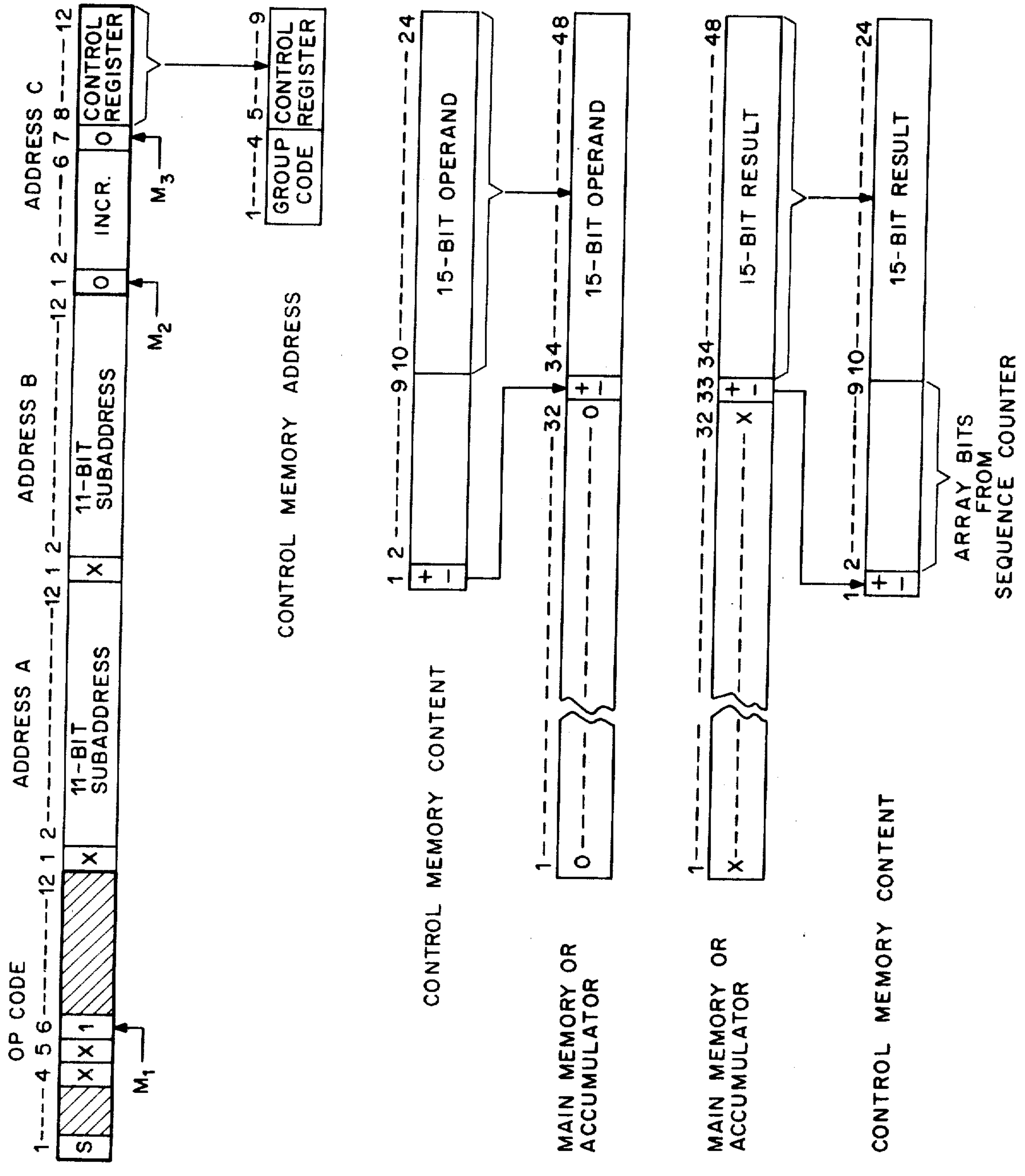
Figure 2D:
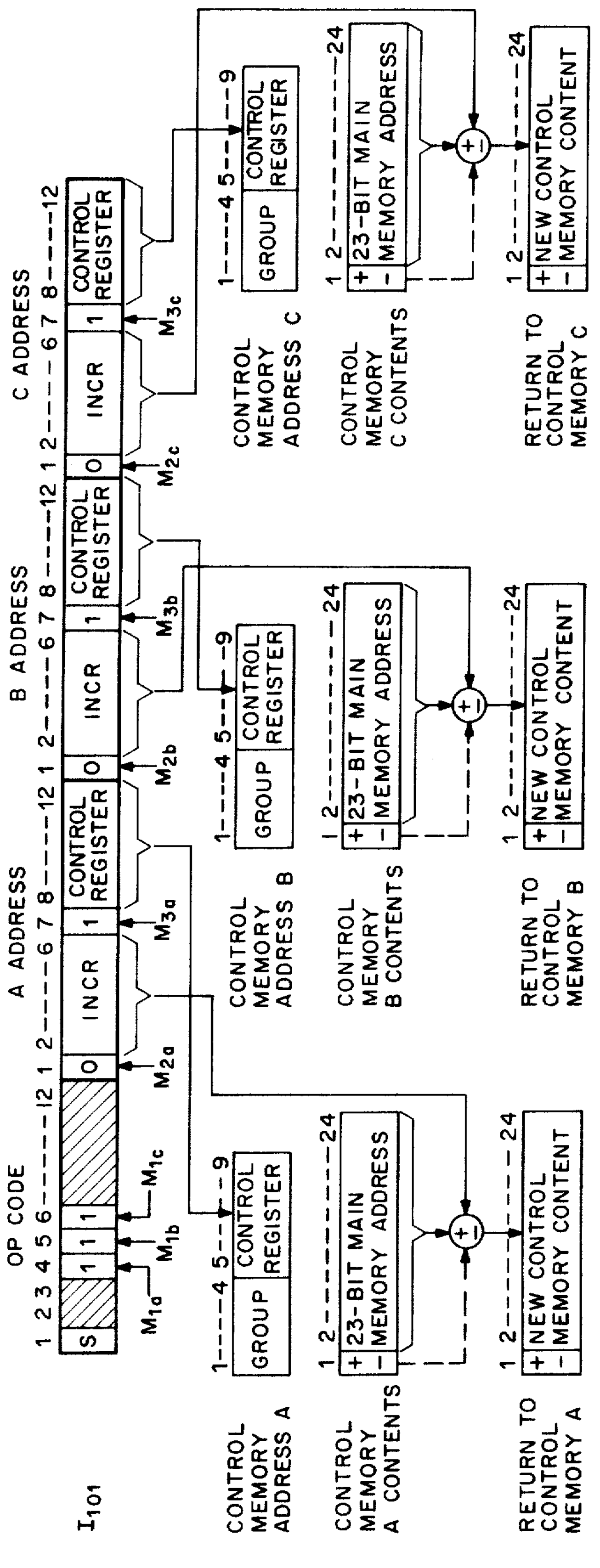
Figure 2F:
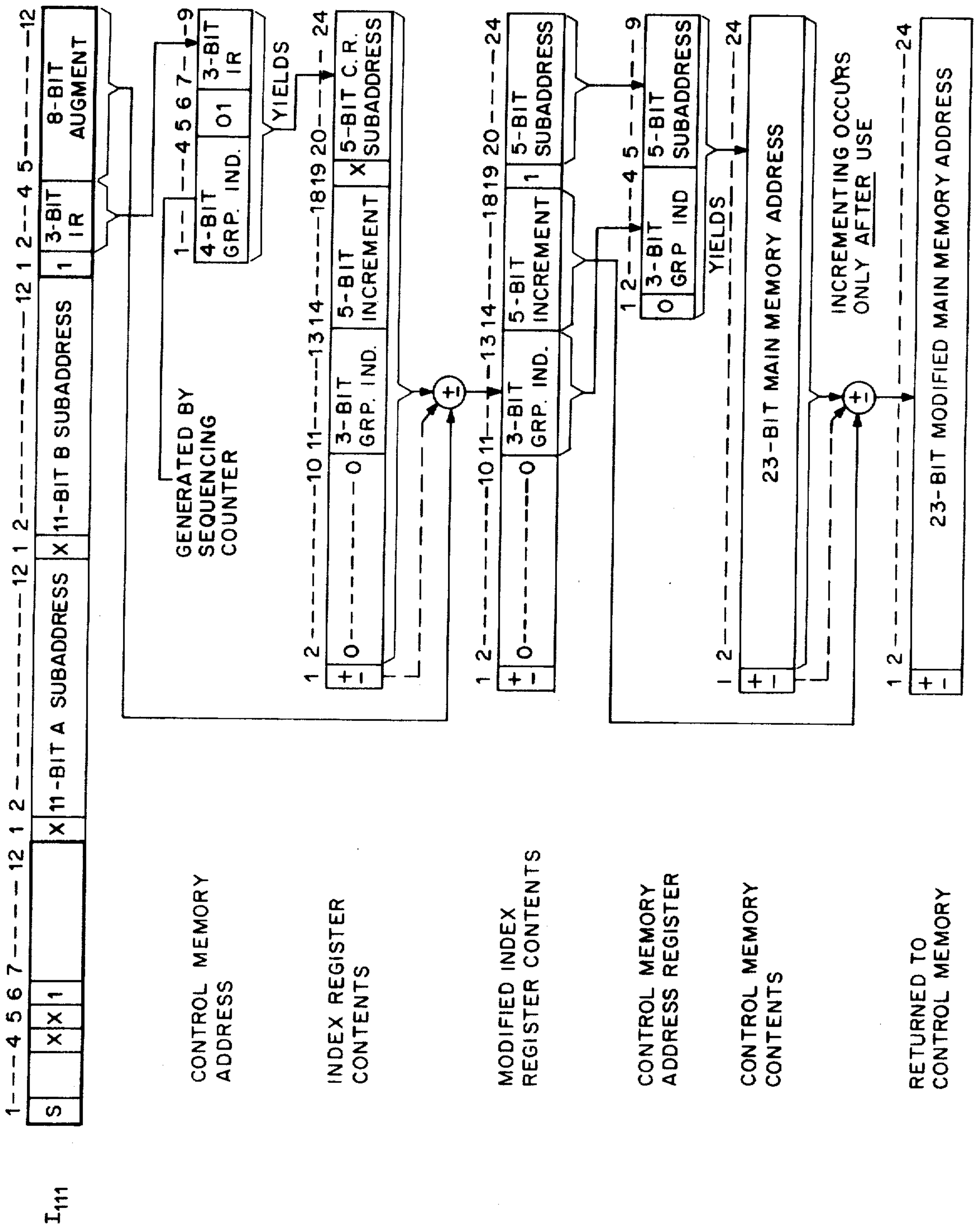
Figure 3A:
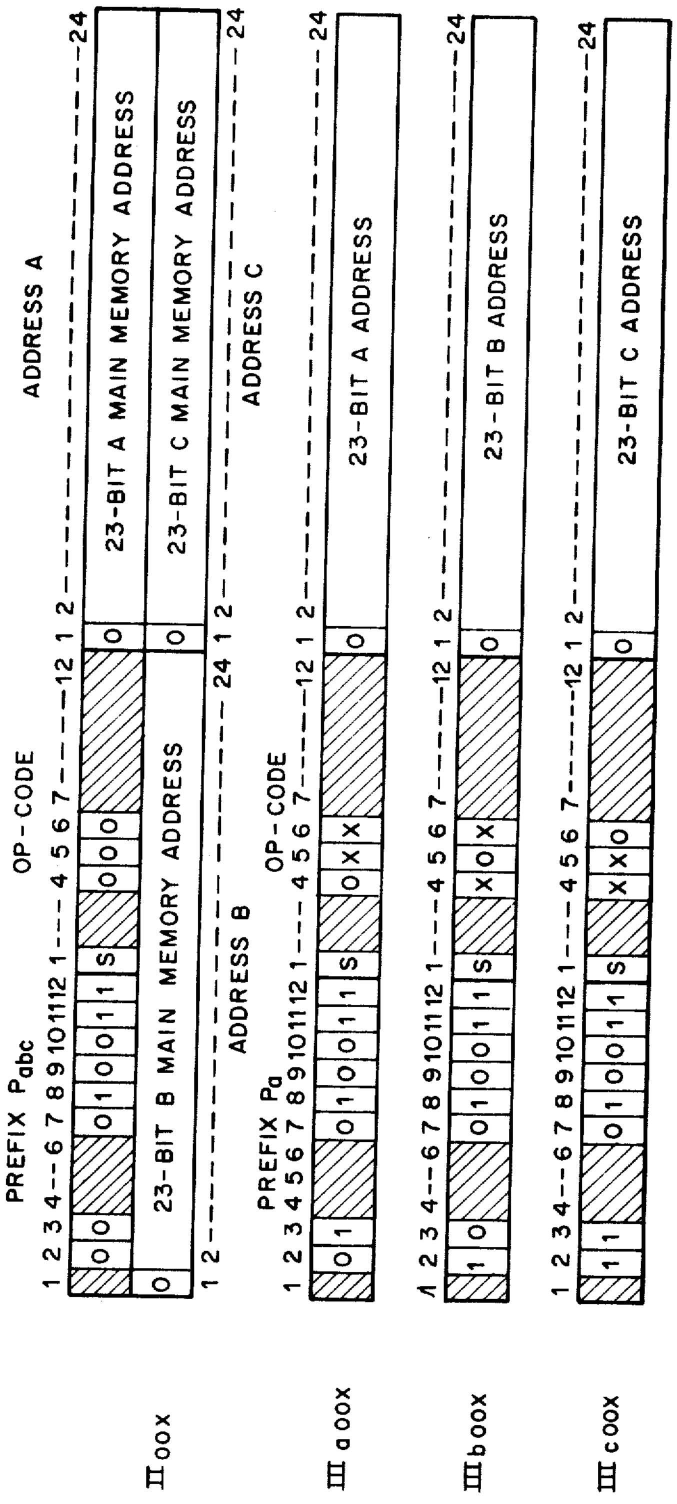
Figure 3B:
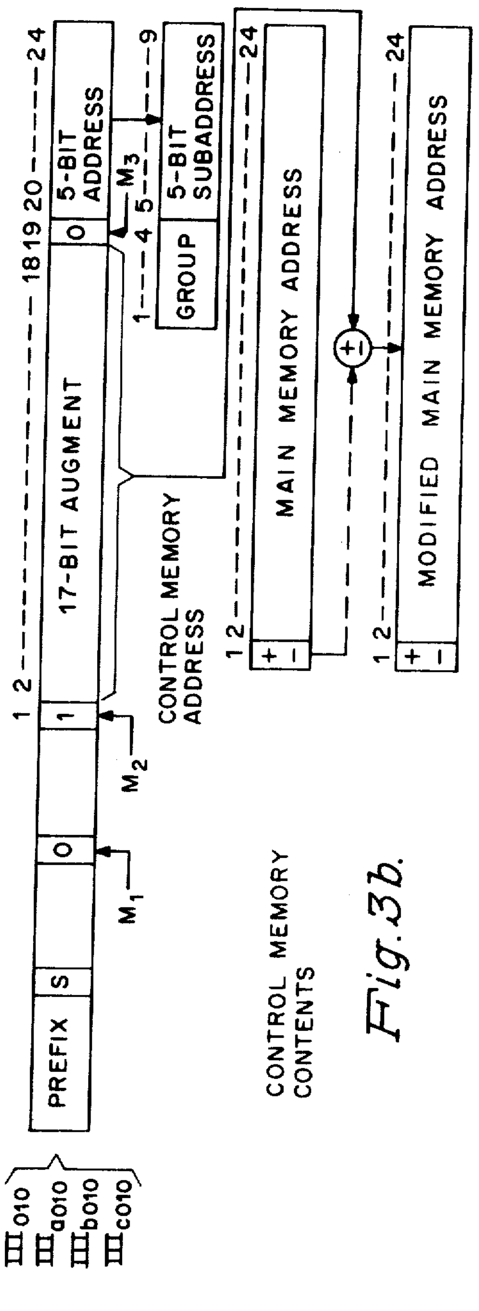
Figure 3C:
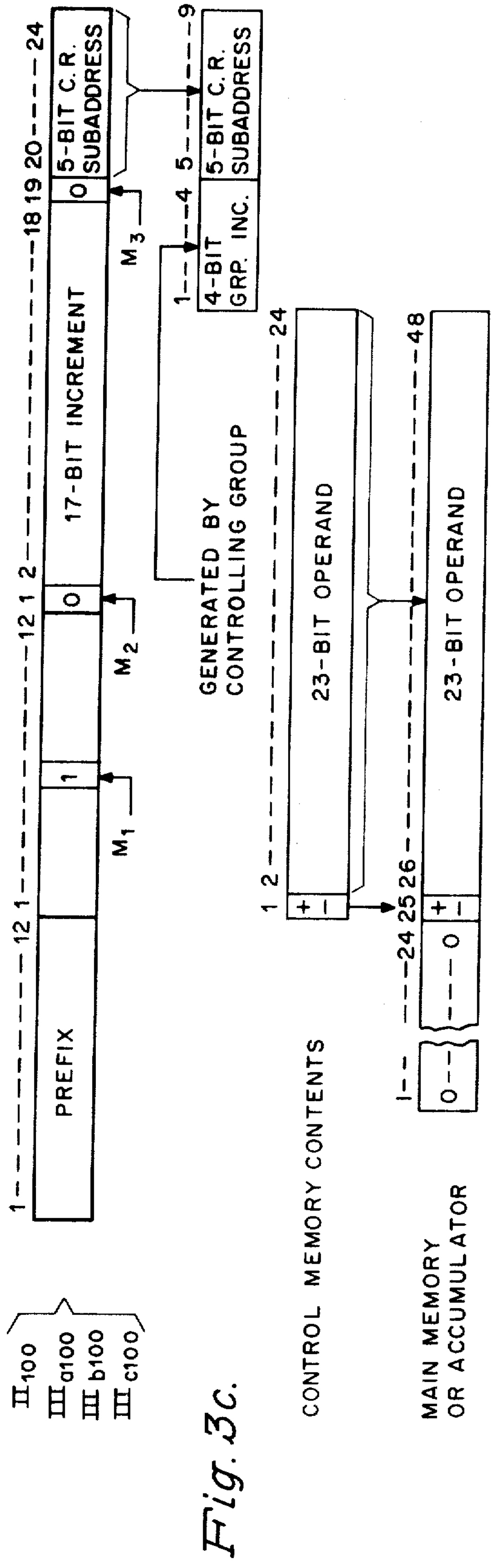
Figure 3D:
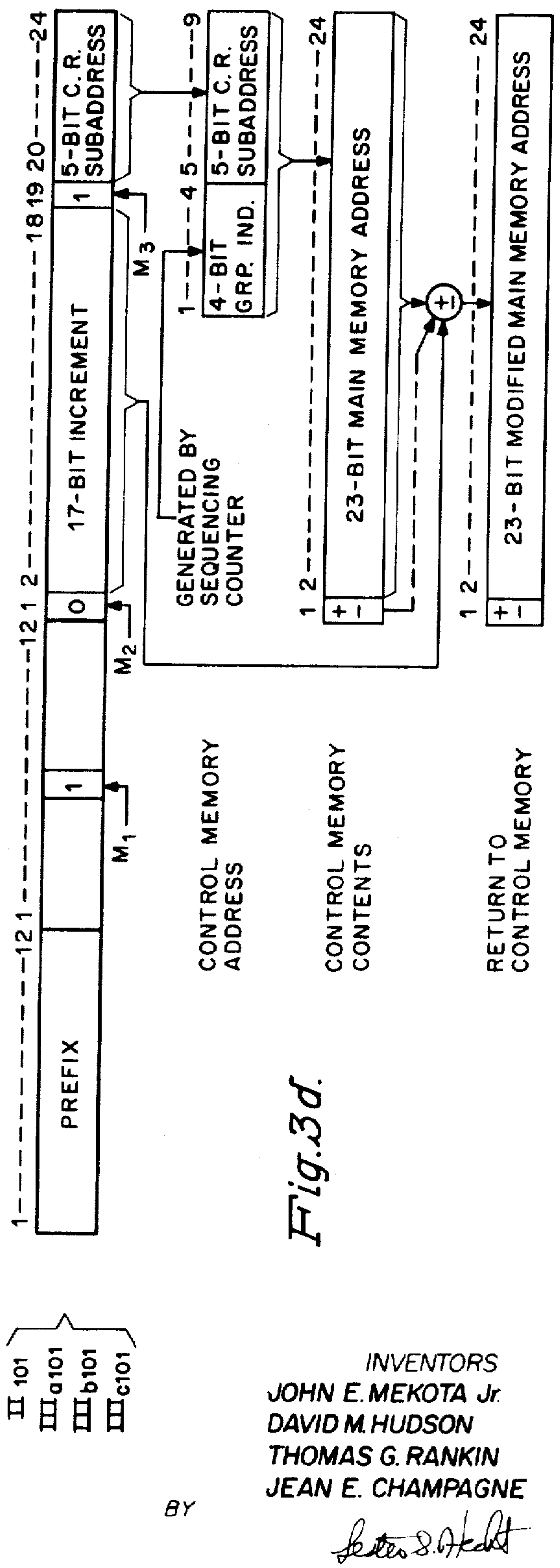
Figure 3E:
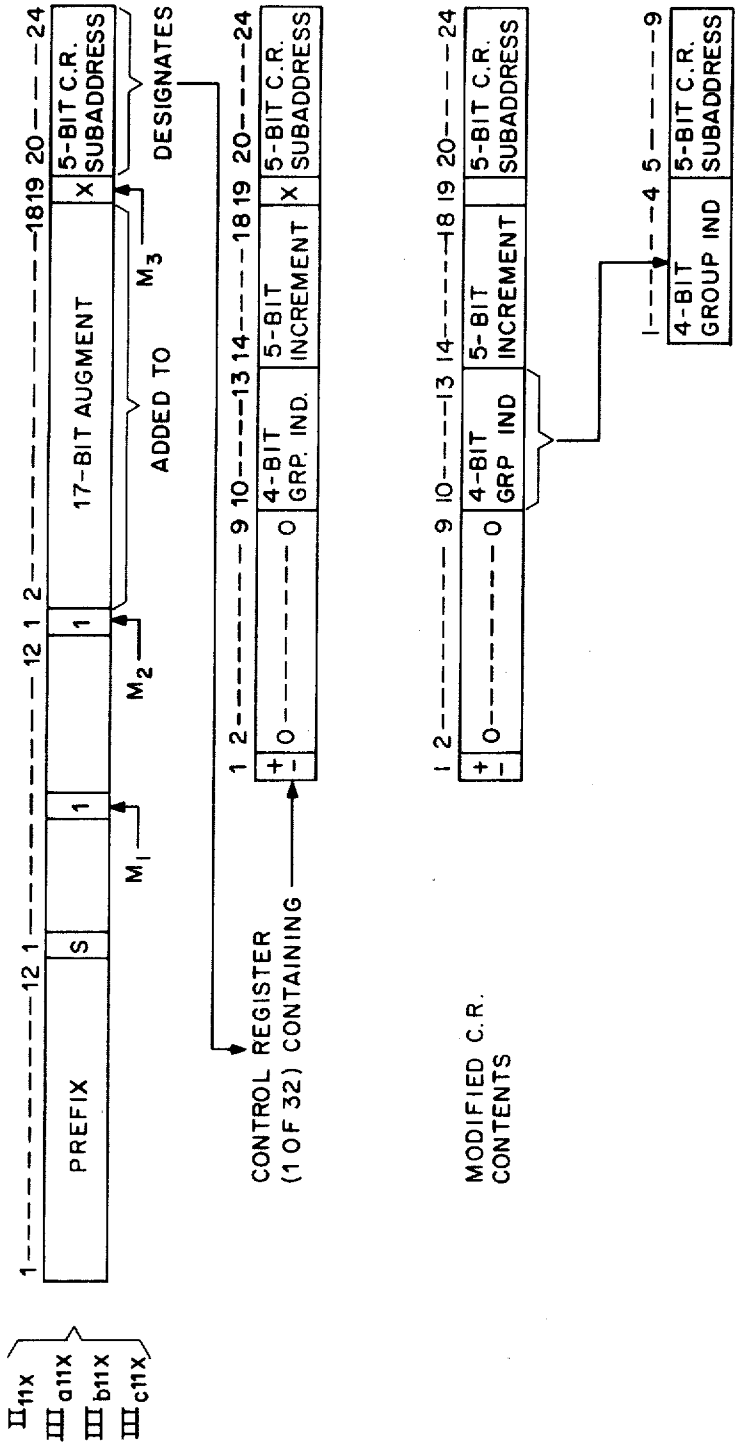
Figure 4A:
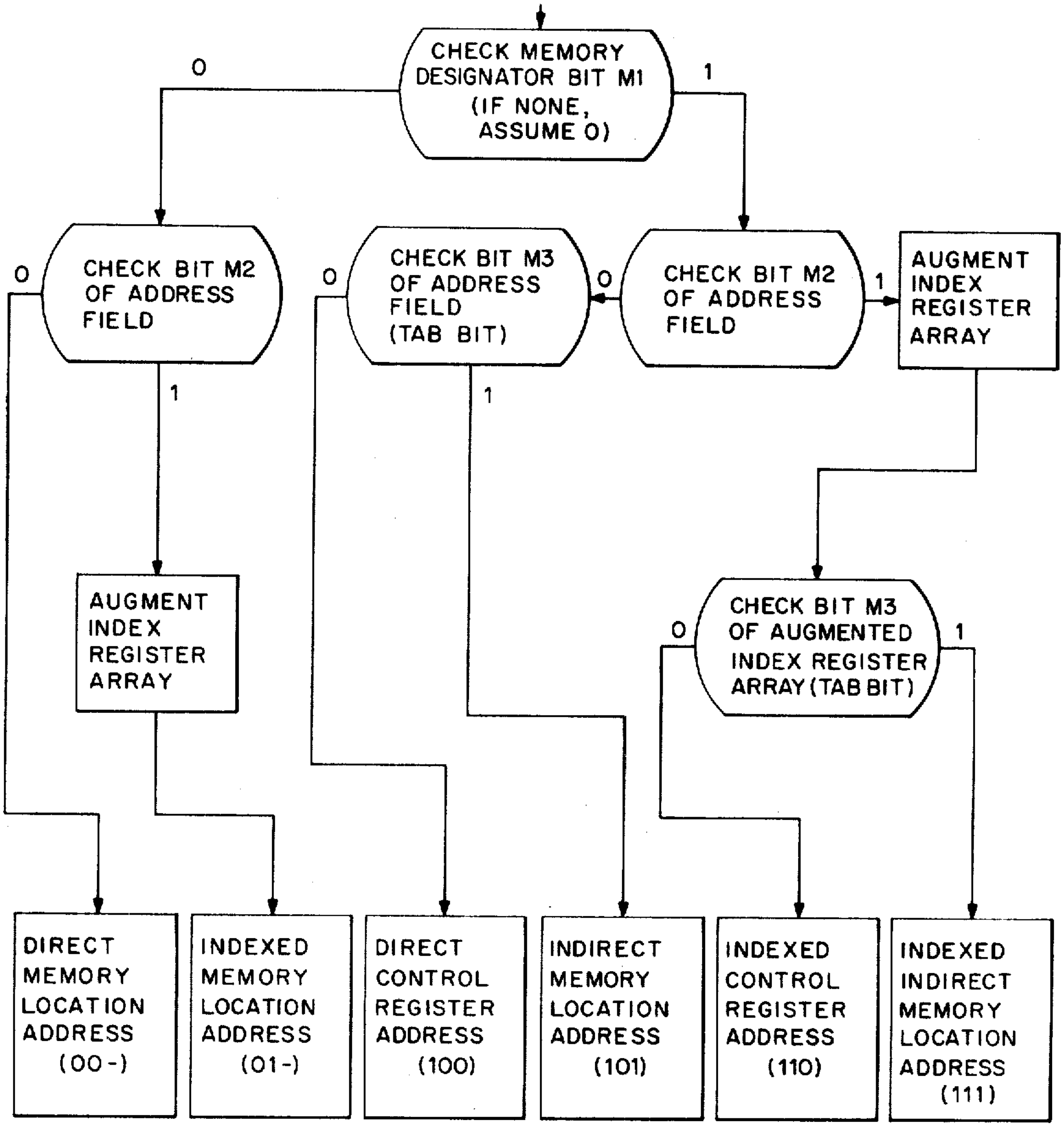

FIG. 1*a* is a chart of a normal instruction form;

FIG. 1*b* is a chart depicting a three address extended instruction form;

FIG. 1*c* are charts of each of three single address extended instruction forms;

FIG. 1*d* depicts the op-code which may be used in systems employing the invention;

FIG. 1*e* depicts the prefix code which may be used for extended instructions in systems employing the invention;

FIG. 2*a* illustrates a normal direct main memory addressing instruction type $I_{00X}$ and shows how a subaddress may be combined with an Array and Bank code to form a complete address;

FIG. 2*b* illustrates normal instruction type $I_{01X}$ where indexed memory location is provided;

FIG. 2*c* illustrates normal instruction type $I_{100}$ where direct control register addressing is accomplished;

FIG. 2*d* illustrates normal instruction type $I_{101}$ where indirect memory location addressing is specified;

FIG. 2*e* illustrates normal instruction type $I_{110}$ where indexed control register addressing is provided;

FIG. 2*f* illustrates normal instruction type $I_{111}$ where indexed indirect memory location addressing is provided;

FIG. 3*a* illustrates extended instruction types $II_{00X}$, $IIIa_{00X}$, $IIIb_{00X}$, and $IIIc_{00X}$ corresponding to the extension of instruction type $I_{00X}$ of FIG. 2*a*;

FIG. 3*b* illustrates the extended instruction types $II_{01X}$ $IIIa_{01X}$, $IIIb_{01X}$, and $IIIc_{01X}$;

FIG. 3*c* illustrates the extended instruction types $II_{100}$, $IIIa_{100}$, $IIIb_{100}$, and $IIIc_{100}$;

FIG. 3*d* illustrates the extended instruction types $II_{101}$, $IIIa_{101}$, $IIIb_{101}$, and $IIIc_{101}$;

FIG. 3*e* illustrates the extended instruction types $II_{11X}$, $IIIa_{11X}$, $IIIb_{11X}$, and $IIIc_{11X}$;

FIG. 4*a* is a flow diagram indicating how the various bits of an instruction are interpreted;

FIG. 4*b* is a chart summarizing all of the instruction formats for both normal and extended operations; and FIG. 5 is a block diagram of a typical system utilizing the present invention.

A typical system utilizing the invention has a main memory with a number of banks of storage locations, each location capable of storing a 48-bit word which word may be an instruction or a data word. Each memory locale is addressable by a 24-bit coded address including a sign bit, an eight-bit array code, a four-bit bank indicator and an 11-bit subaddress code.

The control memory of the system selects, interprets and directs the execution of instructions. This control memory includes eight groups of 32 registers in each group. Each group of control registers has a sequence register, index register and a number of general purposes registers. Each register has a capacity of 24 bits; thus, each register may store the complete address of a main memory location. Each register is addressable by a unique nine-bit code including a four-bit group indicator and a five-bit subaddress. Generally, an instruction is sequenced under the control of one specific group of the eight groups of registers and all instruction execution is directed and controlled by that particular group. The manner of assignment of an instruction to a particular group is of no direct concern in this invention and will not be further discussed herein.

Address instructions may be interpreted a number of ways within the processor to form an address. Direct addressing is an explicit statement of the desired memory location set forth as the subaddress of that instruction. Indexed addressing is a method augmenting an address location stored in an index register to form the complete address. Indirect addressing is an addressing method which states the address of a control register in which the desired address is stored.

Three general forms of instructions are provided according to the invention. Class I is referred to herein as a normal instruction, FIG. 1*a*, and includes an op-code field containing 12 bits, an address A field with 12 bits, an address B field with 12 bits and an address C field with 12 bits. The total word size is thus 48 bits. Type II as shown in FIG. 1*b* is similar to type I, however, each address Field A, B and C contains 24 bits instead of 12. The op-code field with 12 bits is shifted to the right in order to introduce the prefix of 12 bits referenced in this instance as P*abc*. The third type of instruction FIG. 1*c* relates to three possible extended address instructions where addresses A, B and C are present individually in each type. Thus prefix P*a*, prefix P*b* and prefix P*c* appear in a type III along with the respective address A field, address B field and address C field, respectively. In each of the type III instructions, as in type II instructions, the 12 bit op-code field appears in bit positions 13 to 24.

The type III instruction performance is identical to that of the same operation code in Type I format if the absent addresses be set to "inactive." An "inactive" type I address is indicated by an address field of 12 binary 1's, and implies operand delivery to or from internal registers (accumulator, mask register, etc.) rather than a main or control memory location.

FIG. 1*d* also shows the general form of the op-code field, where, starting from the left, the letter S represents a special bit relating to the use of a sequence or co-sequence counter. This will not be considered further in this specification since the use thereof does not relate in any manner to the present invention. Bit positions 2, 3, and 7 through 12 are cross-hatched indicative of specific values contained therein since these bit positions contain the operation designation portion of the op-code field and define various configurations of operations such as add, subtract, multiply, etc. Important bits in the op-code field for the purpose of the present invention are those in bit positions 4, 5 and 6 referenced as *a*, *b*, *c*, respectively. These bits will be referred to as memory designator bits and will be used throughout the specification in various code definitions. The memory designator bit "*a*" relates to the use of address A field, the memory designator bit "*b*" relates to the use of address B field, and the memory designator bit "*c*" relates to the use of address C field.

The prefix code, FIG. 1e must be one which does not exist in the standard op-code field set so that, in the use of the invention, the system may contain a decoder which upon sensing the prefix configuration enters the special extended instruction interpretation forming a part of the invention. In this particular embodiment, the prefix code is identified as such by bits seven through 12 which contain 010011, respectively. Bits two and three designate a type II or III instruction. The following table indicates the contents and meaning of bits two and three.

TABLE I

| Type | Prefix | Bit 2 | Position 3 |
|---|---|---|---|
| II | P*abc* | 0 | 0 |
| III*a* | P*a* | 0 | 1 |
| III*b* | P*b* | 1 | 0 |
| III*c* | P*c* | 1 | 1 |

It is important to note in the use of the invention that the extended instruction interpretation will continue only as long as that particular extended instruction which is being executed remains in operation. As soon as this operation is complete the next instruction must be interpreted without any prior reference. Thus the technique of the invention makes it possible to introduce an extended instruction interpretation sequence which will continue only as long as is necessary to carry out the execution of one instruction. An advantage of this approach is that, in the event of an interrupt, no special bookkeeping must be made to remember whether or not the operation which was interrupted was extended or not. This operational procedure is based on the premise that any instruction in process during an interrupt will be completed or if not completed will be repeated from the very beginning. Further, modal operation or cycling from a normal to an extended mode is eliminated, thereby reducing processing time.

Six types of instructions in the normal form type I instructions, are shown in FIGS. 2*a* through 2*f*. Each of these is defined in terms of the state of a memory designator bit, $M_1$, the state of the most significant bit or bit 1 of the address field, $M_2$, and the state of a tabular bit, $M_3$, which in some cases is not considered.

Throughout the remainder of the specification, for convenience in understanding, instructions will be referenced by utilizing the following designation:

$$N_{M\ M1\ M2\ M3}$$

where N refers to the general type of instruction as shown in FIG. 1. Thus N may be:

I. a normal nonextended instruction

II. a three address extended instruction word or

III. a single address extended instruction word.

$M_1$ refers to the memory designator bit FIG. 1d shown in bit positions 4, 5 and 6 of the op-code field. The designator in location 4 is concerned with the address A field, that in position 5 is concerned with the address B field and that in position 6 is concerned with the address C field. Generally, if the bit is in a zero state "0," reference is to a main memory address. If the bit is in a one state "1," reference is to a control register of control memory;

$M_2$ refers to the index or first bit of a particular address field. If the index bit is in a zero state "0," addressing is not indexed and if the index bit is in a one state "1," an addressing operation is indexed; and, $M_3$ is a tabular bit which will be found only in instructions utilizing the control memory or control registers. If main memory is addressed, the tabular bit is not present and the position will be designated by an "X." If the tabular bit is present it is found in bit position 7 of a normal length address field or bit 19 of an extended length address field, FIG. 2*d* and 3*d*. If this bit is in a zero state "0," the instruction utilizes a direct control register technique. If a "1" state is indicated, the instruction uses indirect control register addressing.

NORMAL ADDRESSING

Referring now specifically to FIG. 2*a*, it is noted that in the normal addressing without indexing the 11 bits following bit 1 of the Address A, B or C fields represent a subaddress and therefore do not completely specify an entire memory location. These 11 bits must be combined with four bits of a bank code which occupies positions 10 through 13 and further with eight bits of an array code. The total configuration thereby constitutes a complete address of 23 bits. The sign bit, bit position 1, in the address field is not used unless there is indexing. The array and bank codes bit positions 2 through 9 and 10 through 13 are stored in the sequence register and are appended to the subaddress.

Referring now to FIG. 2*b*, it will be noted that in this case the 11 bits which normally correspond to the subaddress are used for two different purposes. Bits 2 through 4 constitute an index register selection code providing 8 possible index registers. These bits are combined with preset bits five and six which are 0 and 1 and a group indicator code bits one through four. The total of nine bits specifies a particular control memory address wherein the selected index register exists. The index register contents shown below the control memory address in FIG. 2*b*, includes a sign bit in position 1 and 23 bits of main memory address. This index register content is combined according to the sign of bit 1 of the index register with bits five through 12 of the selected address in the instruction. These bits are referred to as the augmentor and are combined according to the sign bit of the index register content to form a 23 bit modified main memory address which constitutes the index address which is used for the execution of the particular instruction. The operand portion of the main memory or accumulator (bits 25–48) are transferred to the control memory as shown in the last two forms of FIG. 2*b*.

Thus far no operation code has been extended in any manner since we have not yet considered the effect of a prefix code. Before consideration of a modified or extended instruction, the remaining set of four types of instructions in normal form will be described with reference to FIGS. 2*c* through 2*f*.

Referring now to FIG. 2*c*, it will be noted that the instruction type is $I_{100}$ which specifies an unindexed control memory address with direct addressing. This is the first case where we have considered a particular value for the tabular bit, $M_3$ which constitutes bit 7 of the selected address field. In this example we refer to address C and make additional reference to memory designator bit "*c*" in position 6 of the op-code field. The control memory address is obtained by placing Control Register (CR) bits occupying positions 8 through 12 of the 11 bit subaddress of Address C field, the 5 bit control register subaddress, in positions 5 through 9 of the control memory address. These five bits are combined with the four bit group code which has previously been referred to (see FIGS. 2*a* and 2*e*) to form a nine bit control memory address directly.

The control memory contents are addressed by the control memory address if the specified control register specifies an operand location. The low order 15 bits, bits 10 to 24, and the sign bit, bit 1, of the control memory contents, are transferred to the low order 16 bits, bit 33, and bits 34 to 48 of the main memory or accumulator (which may be a portion of the system referred to in FIG. 5 as "OTHER CPU LOGIC"). Incrementing may occur after use of this address to permanently alter the content of the specified register. However, if the specified control register sets forth a result location, the bits 33 and, 34 to 48 in the main memory or accumulator and the higher order bits two to nine from the specified control register, together with the bank and array bits from the sequence counter are transferred to the control memory as shown in the last two forms of FIG. 2c and no incrementing occurs.

In FIG. 2d the instruction type is $I_{101}$, specifying that indirect addressing for the selection of a control memory address is to be performed. It will be noted that all three designator bits, associated address bits, and tabular bits have the same code for each of three address fields. This example has been presented to illustrate the fact that each address field may be considered separately as defining a particular type of addressing or they may all be the same, depending upon the desired application. In the case of FIG. 2*d* each address utilization is made the same. Therefore consideration of the function of the A address will serve the purpose of illustrating how each of the other addresses B and C are modified. As in the direct addressing field CR is entered into bits five through nine combined with the group bits, one through four, to specify the control memory address. The control memory address then selects a main memory address having a content which is then combined according to the sign in the main memory address with the increment in bit positions 2 through 6. The combined address is effectively an incremented indirect address which then becomes the new control memory contents. The actual utilization of the new control memory contents will depend upon the instruction being performed. In some cases it may constitute a new address. In other cases it may constitute an arithmetic quantity to be used in further processing or it may relate to an index or a base or any other quantity desired for control purposes and subsequent computation.

Instruction type $I_{110}$, FIG. 2*e*, is an indexed controlled register address instruction which is obtained by adding the augmentor field in bits five through 12 of the address instruction to the selected index register contents. The index register is specified by bits two through four of the address instruction. This combination produces a modification of the index register content which content then specifies the group indication bits 1 thru 4 and control register bits five through nine the bottom form of the figure, to provide a complete address as shown.

The instruction type $I_{111}$ is shown in FIG. 2f where a final main memory address is obtained by both indexing and the indirect addressing. The operation proceeds as follows; the index register code of bits two through four is combined with the group code in bits one through four but the forced zero and one in the position 5 and 6 select the control memory address. This may be considered to be an index register location. The contents of the index register are combined with the augmented field according to the sign of the index register to produce a modified index register contents. The contents of the modified index register are then used to specify a new control memory address register which contains a main memory address. The increment field in the modified register is then combined with the indirectly selected main memory address to produce a modified indexed indirect main memory address which is returned to the control memory for utilization.

EXTENDED ADDRESSING

Having considered all the standard forms of the normal instruction reference now is made to FIG. 3*a* where the four basic types of extended address formats are shown where no indexing or indirect addressing is involved. Type $II_{00X}$ corresponds to $I_{00X}$ where all three addresses are extended. In accordance with that shown in Table I, the prefix code for a three-address extended instruction, has a "0" bit in positions 2 and 3 and the prefix extended operation 010011 in bit positions 7 through 12. Thereafter, a standard op-code is shown, equivalent to the op-code field for normal direct main memory operation as shown in FIG. 2*a* with memory designator bits $M_{1a}$, $M_{1b}$, and $M_{1c}$ occurring in positions 4, 5 and 6, all in a zero state. The index bit, $M_2$, of each of the three 24 bit address fields is a zero and no tabular bit $M_3$ is present.

The form $IIIa_{00X}$ is a single word extended instruction format where the prefix A, Table I, specifies that only address A is present and is doubled with 23 bits of address field and one bit used to identify the precise instruction format. Instruction $IIIb_{00X}$ shows prefix B in selection of the double length address field and in a similar manner $IIIc_{00X}$ uses prefix C selecting the double line C address. Thus it may be seen that the addition of the 12 bit prefix field provides a convenient form of extending the address field to cover a full memory corresponding to the index length in the other form and yet permits the resulting modified or prefixed instruction to fit compactly within the same word length. Instruction type II requires two words because all three addresses are doubled. The other types A, B and C falling within III category each require only a single address because only one of the three addresses which is doubled in length is required for the complete instruction.

FIGS. **3*b* through 3*e* correspond respectively to the extension of FIGS. 2*b* through 2*e*. Continuing now with FIG. 3*b*, only a single word of the extended instructions is shown. It will be understood from the format for $II_{010}$ that one additional word each containing 24 bits for each of the addresses B and C is required. It will be noted that the address contains a 17 bit augmentor in bit positions 2 through 18 of the address. A tabular bit, $M_3$, is located in position 19 which is shown in the "0" state, corresponding to the third bit of the particular designated code, and bits 20 to 24 corresponding to the 5 bit subaddress. Thus in this mode of extension a subaddress is still employed and therefore is not an example as in the case of FIG. 3*a* of an extended completely self-contained direct addressing. The purpose of the extension in the instance shown in FIG. 3*b* is to extend the augmentor. The augmentor contains only eight bits in the example of FIG. 2*b*** of the type $I_{01X}$, whereas in the extended case the augmentor contains seventeen bits. The control memory address specified, contains a main memory address. The main memory address is modified by addition or subtraction, as specified by sign bit one, of the augmentor, bit two through 18 of the address instruction.

Reference is now made to FIG. **3*c* where formats $II_{100}$, $IIIa_{100}$, $IIIb_{100}$, and $IIIc_{100}$ are shown. Whereas the increment in the normal form ($I_{100}$) contains only five bits, the extended formats are increased to 17 bits. Utilization of the components of the address instruction is the same as described in FIG. 2*c***. Thus this represents another case of extendability according to the invention where the address is not completely self-contained but the extension is used to increase the capacity to increment. Of course, it may be noted that a 17 bit increment may be large enough to represent a completely self-contained address for many memory systems.

In FIG. **3*d* the form for extended indirect memory location addressing is shown where the increment is extended in order to increase the power of modification of the main memory address. In other respects this operation is similar to that discussed above with reference to FIG. 2*d*** with the exception that a 17 bit rather than a five bit increment is contained in the address field of the instruction.

FIG. **3*e* shows extended index control register addressing. It may be noted that only one form of this instruction is shown because the tabular bit, $M_3$, in position 19 is not given either a 0 or 1 but is designated by an X. Thus, two forms are possible where one is indexed only $II_{110}$ and the other is indexed and indirectly, $II_{111}$, addressed. The functioning of this instruction should be apparent from the previous example of FIGS. 2*e* and 2*f*. The difference again is the extension of the augment or the augmentor to a 17 bit modifier. Thus FIG. 3*e*** implicitly depicts instructions of the type $II_{110}$, $IIIa_{110}$, $IIIb_{110}$, $IIIc_{110}$, $II_{111}$, $IIIa_{111}$, $IIIb_{111}$ and $IIIc_{110}$.

We have now considered six forms of normal instruction format and six forms of extended instruction formats. If the memory system involved has a total number of word addresses which is less than two to the eleventh power then all extended formats may be considered to be completely self-contained. But in any event in the case where three addresses are extended to 23 bits or two to the 23rd power addresses are extended, all presently known systems can be addressed completely within the instruction addressing field itself. It can definitely be stated that extended addressing makes it possible to generate a completely self-contained address and in most systems available today even the indexed and indirect address forms of the invention are also completely self-contained.

The various forms of interpretation which have been considered are summarized in FIG. **4*a*** which is not intended to represent an actual mechanization procedure but rather to represent a logical representation of the form. Thus, if the related memory designator bit, $M_1$, is a "0" only two possibilities of addressing are present both of which relate to addressing the main memory. If the indexing bit $M_2$, is a "0," direct memory location addressing is specified whereas if it is a 1 indexed memory location addressing is specified. If the memory designator bit $M_1$ is a 1, four forms are possible two of which relate to the control register address and two of which relate to the memory location address.

In FIG. 4b the complete system definition of all twelve possibilities is shown where type I corresponds to the normal instruction; column $M_1$ represents the memory designator, column $M_2$ represents the first bit of the address field referred to as the index bit and the column $M_3$ refers to the optionally used tabular bit. The second set depicts instruction of types II, III*a*, III*b*, III*c* corresponding to the various extended three and single address instructions.

Referring now to FIGS. **4*a* and 4*b*** together, if the memory designator bit $M_1$ is a zero and if the index bit $M_2$ is a zero, direct memory location addressing is specified. If, however, the index bit $M_2$ is a 1, index memory location addressing is specified.

If the memory designator $M_1$ is a 1, and the index bit $M_2$ is a 0, then the tabular bit, $M_3$, bit seven in the normal form and bit 19 in the extended form, may specify direct control register addressing, if a 0; or indirect memory location addressing if a 1. If the indexing bit $M_2$ is a 1, bit 19 of index register $M_3$, the tabular bit, specifies either indexed control memory addressing, a 0, or indexed indirect main memory addressing.

Four other addressing formats are possible since the tabular bit $M_3$ is not used in two cases in each of the sets. Other addressing formats may be introduced without departing from the spirit of the invention.

SYSTEM OPERATION

A typical system which may employ the present invention is shown in FIG. 5 having a main memory 100 and a control memory 200 both with the associated address registers 110 and 210, respectively. A main memory read/write control 120 and control memory read/write control 220 are utilized to operate and control the main and control memories 100 and 200. Output registers 130 and 230 are used as temporary storage devices for words selected from main memory 100 and control memory 200.

The main memory may consist of a number of modules of well-known storage components (not shown) or other types of memory component cells. Each memory word location is 48 bits in length and is directly addressable by a 24-bit address. As shown in the last form of FIG. **2*a*, the address word consists of a sign bit, an eight-bit array, a four-bit bank indicator and an 11-bit subaddress. The memory 100 is divided into a number of separate banks 101 which may be 16 in number ($2^4$), each bank having 2048 ($2^{11}$) separate 48-bit locations 103**. The eight-bit array provides a capacity to access directly additional memory locations throughout the system.

The control memory consists of eight groups 201 of 32 registers each. The 32 registers in each of the eight groups include a sequence register 203, index registers 205, and a number of general purpose registers 207. The address register 210 and output registers 220 may be part of the groups of 32 registers or may be separate and additional registers.

As shown in the normal form of FIG. **2*c*, a control memory address consists of a three-bit group indicator ($2^3$) specifying one of the eight groups 201 of control registers and a five-bit subaddress ($2^5$) specifying one of the 32 registers within a group. The capacity of each control register is 24-bits, generally consisting of a sign bit and 23 address bits, representing an eight-bit array, a four-bit bank indicator and an 11-bit subaddress, thus specifying a main memory location 103**.

The output register 130 associated with main memory is a 48-bit register and the address register 110 is 24 bits. The read/write controls may be of conventional logic, well within the purview of one skilled in the computer arts.

The output of main memory output register 130 is connected at its 12 high-order bits to a detector 300 which in turn is connected to normal address and extended address control devices 410 and 510 which may be controls of the nature of those described in U.S. Pat. No. 3,560,933 to Schwartz and assigned to the assignee of the instant invention. The detector 300 may be a conventional decoder with a series of indicators fed therefrom.

The output register 130 also feeds the normal and extended address controls 410 and 510, and op-code field storage device 420 via gate 430, which is enabled by the prefix detector 300 over lead 311.

Both the normal and extended address controls 410 and 510 feed other logic in the central processor unit (not shown) and feed main and control memory address registers and read/write controls 110, 210, 130 and 230 respectively.

The detector 300 decodes and detects the prefix code in an extended word, FIG. 1e, and further detects the particular op-code, FIG. 1d specifying the operational sequence of an instruction in either of an extended or normal address instruction. If an op-code field is detected, FIG. 1a, control passes to the normal address control device 410, and the remaining 36 bits of the instruction are read out of output register 130 as three distinct address fields each of twelve bits in length. The subsequencing of each address field is dependent upon the state of the particular memory designator bit $M_1$ appearing in the op-code, index designator bit $M_2$, the first bit of each of the address fields and the tabular bit $M_3$, if present, FIGS. 4a and 4b.

If, on the other hand, the prefix code is detected by detector 300, control is passed to the extended address control 510. The op-code field FIGS. 1b and 1c, is shifted from bit positions 13 through 24 to bit positions 1 through 12. The prefix type, i.e., Pabc, Pa, Pb, Pc, bits two and three of the prefix determine the subsequent sequencing, FIG. 1e. If the prefix designates an instruction type II, the last 24 bit portion of that word is read as a single address field, and the next consecutive memory word is read as two 24 bit address fields. The appropriate sequence counter is stepped by a count of two. If the prefix designates a type III instruction, the last 24 bits are read out as a single address field and the sequence counter 203 is only stepped by one, as is the case in a type I instruction.

A typical three address self-contained instruction operation code may be as follows: take the operand in memory location specified by address field A, and the operand specified in memory location specified by address field B, add and place the result in location specified by address field C.

The particular group of control registers 201 which control any one sequence and hence the particular sequence register 203 operative during that sequence, is dependent upon and controlled by read-write device 230. The selection of any one group 201 is not germane to this invention and hence no further discussion in this regard is advanced herein.

In operation a fetch signal is generated by one of the sequence counters 203 to initiate a sequence of operation for a particular instruction word. Instruction words, a number of which form a program or a series of programs, and data words are both stored in main-memory 100. The fetch signal causes an instruction to be read from a specified main memory location 103 to the main memory output register 130. Assuming the instruction to be of the type I, normal length, depicted in FIG. 1a. The higher order 12 bits of the instruction are sensed by detector 300 and a determination is made that the prefix is absent and that a normal address instruction is present. Line 311 carries an enable signal to gate 430 and the twelve bit op-code decoded in detector 300 is stored in op-code storage device 420. The Address A field is transferred to normal address control device 410. Memory designator bit four of the op-code field is sensed, $M_1$, and index bit $M_2$, the first bit in address A field is also sensed. Assume a type $I_{00x}$ instruction indicating direct main memory addressing. The 11 bit subaddress is combined with the output of the sequence counter 203 of control memory 200 to form the direct main memory address of a location 103 specified by this combination as shown in the second form of FIG. 2a. This form is transmitted to the address register 110 and at the appropriate time read/write control 120 allows the 48 bit word appearing therein to be transferred to output register 120 and thereafter to the designated position of the central processor unit specified by the op-code under control of read/write control 120. As shown the op-code is transmitted to other portions of the processor.

Slightly after the Address A field subsequence is commenced, the Address B field is sequenced, under control of the control register group 201 specified by read/write control 230. The control memory read/write control 230 performs proper extraction and timing. Gate 440 would be enabled and bit 5 of the op-code field sensed at the appropriate time.

As stated hereinbefore, each of the three address fields A, B, and C may be any one of the types shown and described in FIG. 2a through 2f or any combinations of the various instruction types may appear in one complete address instruction.

Hence, for purposes of illustration, let us assume that the B address is an indexed main memory address, type $I_{01X}$, FIG. 2b. Thus bit one of this field $M_2$ would be a 1, specifying indexing. The next three bits, would specify the specific one of eight index registers 205 and such identification would appear as the lower three bits, bits seven to nine of the control memory address. Bits five and six are forced bits 01 and bits one through four are group indicator bits designating the particular group 201 of control registers presently controlling the sequence. This combination designates a complete control memory address stored in the specified index register 205 of the control memory 200. The read/write control 230 causes bits five through 17 of the original address, the augmenter bits, to be added or subtracted, depending upon the sign of the index register 205 content, to the main memory address stored therein, and forms a modified 24 bit main memory address. The augmentation has no effect upon the index register 203 content. If, however, the location specified is a result location, no augmentation takes place and the lower order 24 bits of the memory word are transferred to the appropriate control register 207.

Assume that the third or C address field in the word along with the memory designator bit specifies a direct control memory address, type $I_{100}$, FIG.2c. Op-code memory designator bit six, $M_1$, is a 1, index bit, $M_2$, bit one of the C address field is a 0 and tabular bit $M_3$, bit seven of C address field is a 0.

Bits eight through 12 of the C address field are interpreted as the subaddress of one of the control registers 207 in the same group which included the sequence counter 203 and which selected the instruction. The group indication of that group 201, which made the selection, is attached to the control register subaddress and forms a complete control memory address.

If the specified control register 207 is an operand location, the low-order 15 bits of its contents and the sign bit are transferred to the low-order 16 bits, respectively, of main memory 100 or the accumulator (not shown). Incrementing occurs after use; thus, the contents of the specified register are permanently altered. If, however, the specified control register 207 is a result location, the low-order 15 bits plus the sign bit are transferred respectively, from the low-order 16 bits of the accumulator to the low-order 15 bits and the high-order bit positions of the specified control register, together with the bank and array bits from the sequencing counter 203. No incrementing takes place as discussed with regard to FIG. 2c hereinbefore.

Under control of the read/write control 230, the next instruction in sequence is extracted from memory. Assume this instruction to be a type II self-contained expanded three address instruction, FIG. 1b.

Upon arrival at the output register 130 and thereafter at detector 300, the first twelve bits of the instruction are sensed. A prefix Pabc is sensed. Bits 13 through 24, the op-code, is shifted to bit position 1 through 12 in the output registers 130. The op-code is properly decoded in detector 300 and stored in storage device 420. The 24 lower order bits, comprising the expanded A address are extracted from the output register and are stored in extended address control 510. If main memory is designated by bit four of the op-code and bit one of the address field is zero, the address location code is fed directly to address register 110, specifying that the word in that location be read out directly to the appropriate location in the central processor specified by the op-code. The extended address control 510, commands the read/write control 120, to read out to output register 130 the next successive 48 bit word in memory following the 48 bit instruction which initiated the sequence. The B address field consisting of the high-order 24 bits of the word is then read out to the appropriate location, dependant upon the type of instruction specified. Detector 300 is disabled during the sequence and op-code storage retains the original 12 bit op-code contained in the first half of the instruction.

If bit 5 of the op-code field is a 1, bits one and 19 of the address field are 0 and 1 respectively, the instruction type specified is $II_{101}$, indirect main memory addressing as shown in FIG. 3*d*. Bits 20 to 24 are combined with the four bit group indicator generated by the proper sequence counter 203, to form a nine bit control memory register 207 address. The contents of this register are then augmented by bits two through 18 of the address field, incrementing or decrementing the contents dependant upon the sign bit, bit one of that stored in control register 207.

The modified address is thereafter returned to the control register 207. The main memory address as unmodified is presented to address register 110 specifying a memory location 103. The contents of location 103 are thereafter read out to the appropriate locale dependant upon that specified by the op-code field. Similarly address C field is operated upon and the appropriate word is read in or out of main memory 100 dependant upon the indication of an operand or a result.

The sequence counter 203, initiating this sequence, is incremented by a count of two since two 48 bit words, FIG. 1*b*, were read from memory forming the expanded instruction type II. If the instruction had been type III and only one 48 bit instruction read out of memory, the appropriate sequence counter would be incremented by a count of 1. The "OTHER CPU LOGIC" (FIG. 5) performs the proper delivery of operands from, and of results to, internal registers of the CPU as implied by the presence of inactive B and C addresses (only Pa present), inactive A and C addresses (only Pb present), or inactive A and B addresses (only P*c* present).

The sequence is ended and the next instruction called for in sequence is initiated.

It is readily apparent, from an examination of that disclosed hereinabove with reference to FIGS. 2, 3, and 4, how other specific instruction types may be sequenced. Further, it must be evident that instructions of various types I, II, and III utilizing any combination of the basic six formats may be placed in a program or programs in any order whatsoever. No extra time is spent conditioning the machine for any one type of instruction and modal type of operation, i.e. a series of normal instruction, followed by a series of expanded instruction, is completely unnecessary.

The particular prefix code or absence thereof in combination with the op-code is all that need be sensed to initiate a particular sequence called for by that instruction type. It is obvious that the increase in possible storage locations provided by expanded addressing are quite sufficient for most any storage capacity being used now. The added ability for indexed or indirect or indexed-indirect addressing and instruction augmentation either normal or expanded length, provides a degree of flexibility far in excess of that previously known.

Other embodiments will occur to those skilled in the art and within the purview of the following claims.

What is claimed is:

1. In a data processing system wherein at least one memory is utilized to store instruction words containing an op-code field which contains either a normal op-code or a prefix code; and at least one address field; the improvement comprising the method of:

reading one of said instruction words from said memory;

detecting the bits of the op-code field read from memory, producing a first control signal if a normal op-code is detected or producing a second control signal if a prefix code is detected instead of said normal op-code;

using said normal op-code to specify an operation to be performed and using said one address field to specify the location of an operand to be used in said operation in response to said first control signal; and, reading another portion of said instruction word in response to said second control signal to sense the op-code for an operation to be performed and to extend said one address field of said instruction word to include another portion of said instruction word to specify an address for any location in said memory.

2. In a data processing system having a first and second memory, at least one of the memories utilized to store both instruction and data words, each instruction word containing an op-code field which contains either an op-code or a prefix code and at least one address code field indicative of the ultimate location in one of said memories from which a word is read, to which a word is to be written, or the contents of which are to be modified, a designator bit in said instruction word defining whether a location in said first or second memory is to be addressed, an index bit defining whether the address field code is to be used to modify or to be modified by the content of the location specified therein, and a tabular bit defining whether said location specifies the ultimate memory location directly or specifies a location at which the address of the ultimate location is specified, control means responsive to said instruction word to perform any one or any combination of said functions to produce an address as specified by said instruction words, the improvement comprising the method of:

reading one of said instruction words from memory;

detecting the bits of the op-code field of said instruction word, producing a first control signal if a normal op-code is detected or producing a second control signal if a prefix code is detected in place of said normal op-code;

executing normal usages of said normal op-code and said one address field respectively to define an operation to be performed by said control means and the memory location of an operand used in said operation in response to said first control signal; and, executing an extended address detecting operation whereby the bits of another portion of said instruction word are sensed to provide an op-code and the address found in said address code field is extended to include a further portion of said instruction word in response to said second control signal.

3. The method of claim 2 including the step of; coding an instruction word to contain three address code fields and three sets of each of said designator, index and tabular bits.

4. The method of claim 3 including the steps of; specifying said first memory by one of said designator bits, specifying no modification of the addressing content with said index bit and the absence of said tabular bit, thereby defining a self-contained address in one of said address fields capable of addressing any location in said first memory.

5. The method of claim 3 including the steps of; specifying said first memory by one of said designator bits, specifying modification of the content of the location set forth in one of said address code fields with said index bit, and the absence of said tabular bit thereby defining modification of the content of said field by an extending augment in one of said address fields.

6. The method of claim 3 including the step of; specifying said second memory by one of said designator bits, specifying the ultimate location directly by said index bit and specifying no modification of the content of said location by said tabular bit, thereby defining in one of said address fields a self-contained address in said second memory.

7. The method of claim 3 including the steps of; specifying said second memory by one of said designator bits, specifying no augmentation by said index bit and specifying indirect addressing by said tabular bit, thereby defining an extended address form in one of said address fields capable of addressing any location in said second memory.

8. The method of claim 3 including the steps of; specifying the second memory by one of said designator bits, specifying indirect addressing by the index bit and specifying no modification by the tabular bit, thereby designating indirect addressing of said second memory.

9. The method of claim 3 including the steps of; specifying said first memory by one of said designator bits, specifying modification of the content of said location specified in one of said address field by said index bit and specifying indirect addressing by said tabular bit thereby defining an address field having an extended capacity to address any of the contents of said second memory in order to modify the contents of the location set forth and to address said first memory with said modified content.

* * * * *